United States Patent
Lee

(10) Patent No.: US 6,781,274 B2
(45) Date of Patent: Aug. 24, 2004

(54) ROTOR FOR SYNCHRONOUS MOTOR AND METHOD OF MANUFACTURING THE SAME

(75) Inventor: Seok-jin Lee, Suwon (KR)

(73) Assignee: Hong Sik Jeong, Seoul (KR)

( * ) Notice: Subject to any disclaimer, the term of this patent is extended or adjusted under 35 U.S.C. 154(b) by 203 days.

(21) Appl. No.: 10/007,239

(22) Filed: Nov. 13, 2001

(65) Prior Publication Data

US 2002/0140311 A1 Oct. 3, 2002

(30) Foreign Application Priority Data

Mar. 27, 2001 (KR) .......................... 2001-15832

(51) Int. Cl.$^7$ ............................ H02K 1/06; H02K 1/27; H02K 21/12
(52) U.S. Cl. ............ 310/216; 310/156.53; 310/156.56; 310/211
(58) Field of Search .............................. 310/216–218, 310/211, 261, 156.53, 156.56

(56) References Cited

U.S. PATENT DOCUMENTS

| | | | | | |
|---|---|---|---|---|---|
| 2,944,171 | A | * | 7/1960 | Alger | 310/211 |
| 3,590,208 | A | * | 6/1971 | Martini et al. | 219/92 |
| 4,144,469 | A | * | 3/1979 | Miyashita et al. | 310/156.28 |
| 4,188,554 | A | * | 2/1980 | Binns | 310/156.78 |
| 4,403,161 | A | * | 9/1983 | Miyashita et al. | 310/156.83 |
| 4,469,970 | A | * | 9/1984 | Neumann | 310/156.78 |
| 4,728,842 | A | * | 3/1988 | Martin | 310/217 |
| 5,097,166 | A | * | 3/1992 | Mikulic | 310/156.83 |
| 5,142,178 | A | * | 8/1992 | Kloster et al. | 310/217 |

* cited by examiner

*Primary Examiner*—Tran Nguyen
(74) *Attorney, Agent, or Firm*—Jeffrey D. Moy; Harry M. Weiss; Weiss, Moy & Harris, P.C.

(57) ABSTRACT

A rotor of a synchronous motor and a method of manufacturing the same. The rotor of the synchronous motor comprises a main core, formed from a plurality of laminated thin iron sheets, the thin iron sheets having a hole at a center for receiving a rotating shaft, and a number of magnet holes and induced conductor holes radially disposed in the thin iron sheets at a predetermined space differently from the hole. A plurality of magnets are inserted into the magnet holes of the main core. Supplementary cores, having a hole and induced conductor holes corresponding to the hole and the induced conductor holes of the main core, are disposed at the ends of the main core wherein the magnet is inserted. An induced conductor formed by ingoting through the induced conductor holes of the main core and the induced conductor holes of the supplementary cores. Consequently, through the induced conductor and the magnet, the efficiency of the motor can be improved. Furthermore, productivity can be also increased because of shortened manufacturing procedure, since the magnet is naturally secured by ingoting the induced conductor through the main core and the supplementary cores.

4 Claims, 4 Drawing Sheets

ROTOR FOR SYNCHRONOUS MOTOR AND METHOD OF MANUFACTURING THE SAME

BACKGROUND OF THE INVENTION

1. Field of the Invention

The present invention relates to a synchronous motor, and more particularly to a rotor of a synchronous motor and a method for manufacturing the same.

2. Description of the Related Art

A synchronous motor is a kind of alternate current motor. It has a stabilized rotating characteristic by being synchronized with an input frequency. It also can change a rotation frequency of the motor by changing a power frequency.

FIG. 1 is a longitudinal sectional view of a conventional rotor of a synchronous motor. Referring to FIG. 1, the rotor 20 includes an iron core 22 and an aluminum bar 21 passing through the iron core 22 permitting an induced current to flow easily from a stator (not shown).

The iron core 22 is made of a plurality of laminated thin iron sheets 10. One of the thin iron sheets 10 is shown in FIG. 2. A shaft hole 11 is formed at a center of the thin iron sheets 10 for receiving a rotating shaft (not shown). A plurality of aluminum-inserting holes 12 are radially formed around the outer circumference of the thin iron sheets 10.

The aluminum bar 21 is formed by ingoting aluminum material into the aluminum-embracing holes 12 at the iron core 22 formed of the laminated plurality of iron sheets 10.

When an induced current is transferred from a winding coil (not shown) to the stator (not shown) through the above construction, the rotor 20 receives the induced current from the aluminum bar 21 and rotates with a rotary shaft (not shown) connected thereto.

Furthermore, for the conventional rotor 20 of a synchronous motor, there is a limit to improve a rotating force of the motor only with the aluminum bar 21. Therefore, to improve the capability of the motor, one or more magnets (not shown) are disposed inside or on an outer circumference of the rotor 20. In addition, if the magnet is disposed inside of the rotor 20, the magnet should be settled using a metal can (not shown) and a rivet (not shown) for preventing the magnet from being separated while being rotated.

However, if the metal can and the rivet are used for settling the magnet, manufacturing procedure can be extended by many steps for producing the rotor 20, thus it can deteriorate the manufacturing capacity.

SUMMARY OF THE INVENTION

The present invention has been made to overcome the above-mentioned problems of the related art. Accordingly, it is an object of the present invention to provide a rotor of a synchronous motor and a method of manufacturing the same capable of shortening a manufacturing procedure and at the same time improving the capability of the motor.

The rotor of the synchronous motor according to the present invention to accomplish the above object, comprises a main core having a hole at a center for embracing a rotating shaft. The main core is formed from a plurality of laminated thin iron sheets that have a number of magnet holes and induced conductor holes radially disposed therein at a predetermined space differently from the hole. A predetermined number of magnets are inserted into the magnet holes of the main core. Supplementary cores, having a hole and an induced conductor hole at the corresponding place to the hole and the induced conductor hole of the main core, are disposed at the ends of the main core that the magnet is inserted therein. An induced conductor is formed by ingoting through the induced conductor holes of the main core and the same of the supplementary cores.

Also, the method of manufacturing the rotor of the synchronous motor of the present invention includes the steps of constructing a main core, having a hole at a center for embracing a rotating shaft, formed from a plurality of laminated thin iron sheets that a number of magnet holes and induced conductor holes radially disposed therein at a predetermined space differently from the hole; inserting magnets into the magnet holes of the main core; disposing a supplementary cores, having a hole and an induced conductor holes at the corresponding place to the hole and the induced conductor holes of the main core, at the ends of the main core; and ingoting an induced conductor through the induced conductor holes of the main core and the same of the supplementary cores.

DETAILED DESCRIPTION OF THE PREFERRED EMBODIMENT

Figure 1:
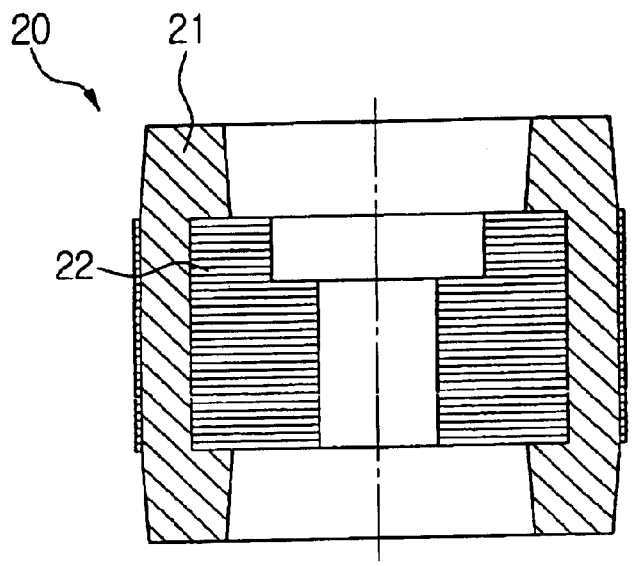
FIG. 1 is a longitudinal sectional view showing a conventional rotor of a synchronous motor.
Figure 2:
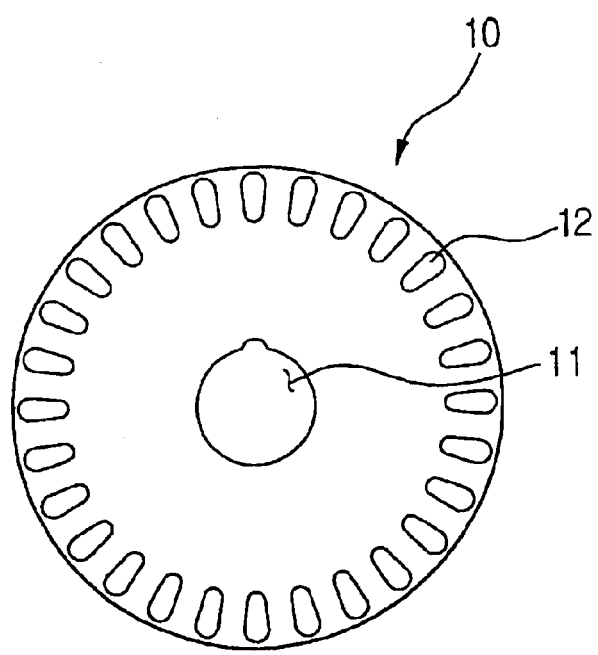
FIG. 2 is a plan view showing each thin iron sheet forming the main core of FIG. 1.

From now on, the preferred embodiment of the present invention will be described referring to the accompanying drawings.

Before the description about the preferred embodiment of the present invention, one shape and one member are designated by a representative reference numeral for a plurality of the same shapes and the same members in the drawings and the description part.

Figure 3A:
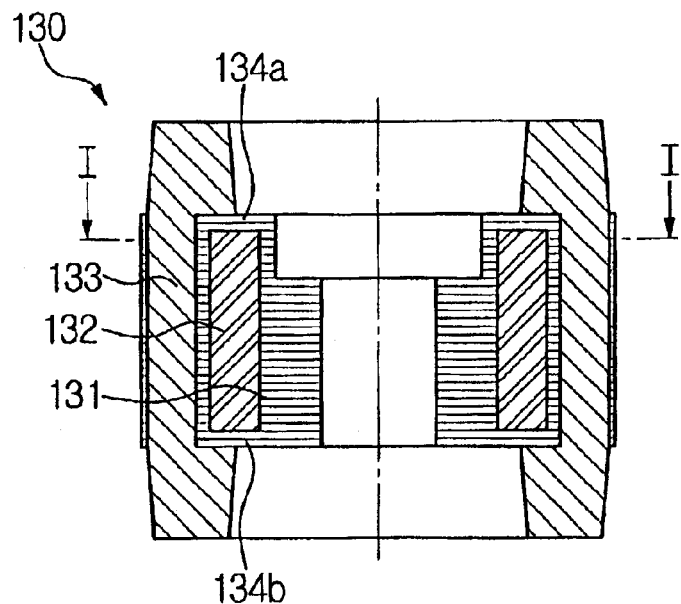
FIG. 3A is a longitudinal sectional view showing a rotor of a synchronous motor according to the present invention.

FIG. 3A is a longitudinal sectional view showing a rotor 130 of a synchronous motor according to the present invention.

Referring to FIG. 3A, the rotor 130 includes a main core 131, a magnet 132, a first and a second supplementary cores 134a and 134b, and an induced conductor 133. As the induced conductor 133, aluminum can be used, for example, and other conductive materials can be applied as well.

The main core 131 is formed by a plurality of laminated thin iron sheets, and the magnet 132 is seated in the main core 131. The first and the second supplementary cores 134a and 134b are disposed at both ends of the main core 131 wherein the magnet is seated. In addition, the induced conductor 133 is formed by being ingoted through the main core and the first and the second supplementary cores 134a and 134b. The first and the second supplementary cores 134a and 134b can be plural sheets or a single sheet.

Through the above construction, when an induced current is transferred from a winding coil (not shown) to a stator (not shown), the rotor 130 receives the transferred induced current from the ingoted induced conductor 133, then rotates with a connected rotating shaft (not shown), and the magnet 132 increases a rotating force while being rotated.

Figure 3B:
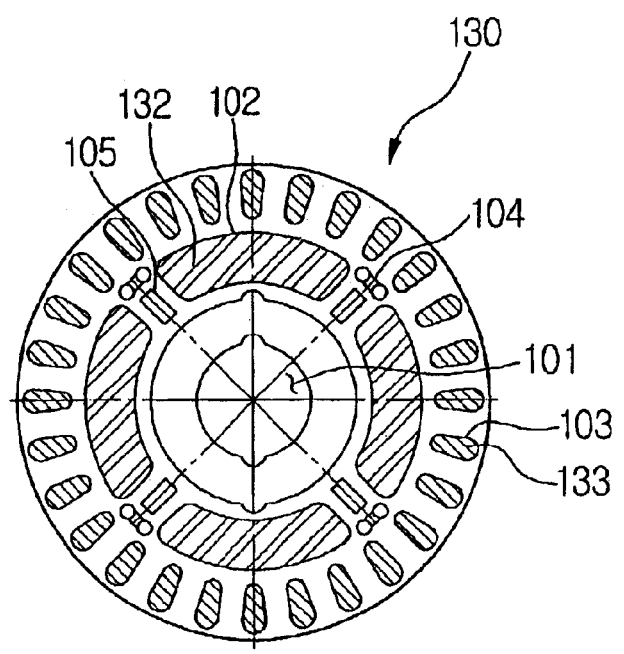
FIG. 3B is a cross sectional view showing the rotor of the synchronous motor taken along the line of A–A' of FIG. 3A in accordance with the present invention.

FIG. 3B is a longitudinal sectional view illustrating the rotor according to the present invention taken along the line of I–I' of FIG. 3A. Magnet holes 102 and induced conductor holes 103 are radially formed from a hole 101 at the rotor 130 with a different space. Four magnets 132 are seated in each of the formed holes 102 and 103, and a plurality of induced conductors 133 are ingoted therein. In addition, between the magnet hole 102 and the magnet hole 102, calkings 104 are formed for fastening the thin iron sheets when laminate them, and also a magnetic flux leakage preventing hole 105 are formed therein.

Figure 4A:
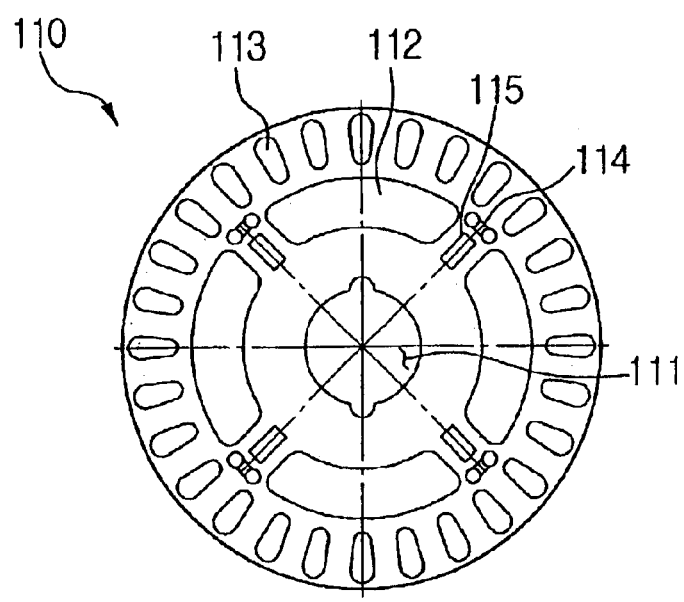
FIG. 4A is a plan view showing the thin iron sheets forming the main core of FIG. 3A.

FIG. 4A is a plan view showing one of the thin iron sheets 110 forming the main core 131 of FIG. 3A.

Each thin iron sheet 110 (hereinafter called main core sheet) has a hole 111 for receiving the rotating shaft (not shown), and four magnet holes 112 are radially formed for embracing the four magnets 132 with a predetermined space from the hole 111. Moreover, a plurality of induced conductor holes 113 are radially formed from the hole 111 with longer length than the magnet holes 112. Each thin iron sheet 110 has a calking 114 in an embossing pattern between the magnet holes 112, and magnetic flux leakage preventing holes 115 for preventing leakage of magnetic flux inside of each calking 114.

Figure 4B:
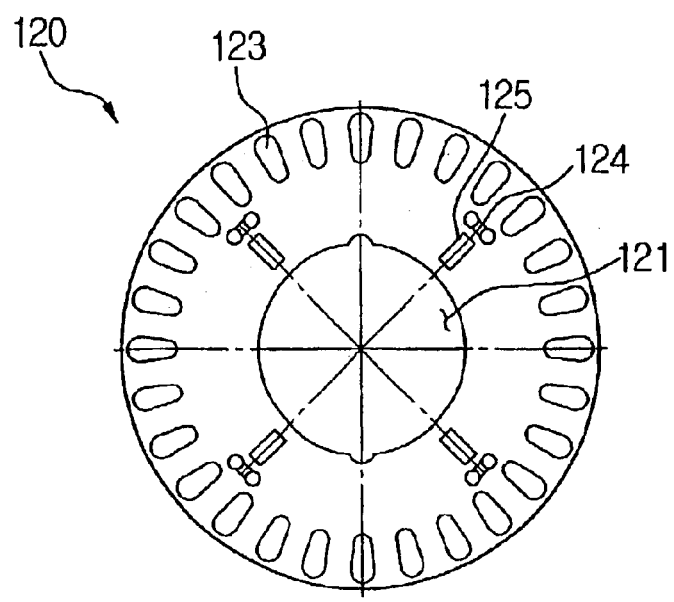
FIG. 4B is a plan view showing the thin iron sheets forming the first supplementary cores of FIG. 3A.

FIG. 4B is a plan view illustrating one of the thin iron sheets 120 forming the first supplementary core 134a of FIG. 3A.

Figure 4C:
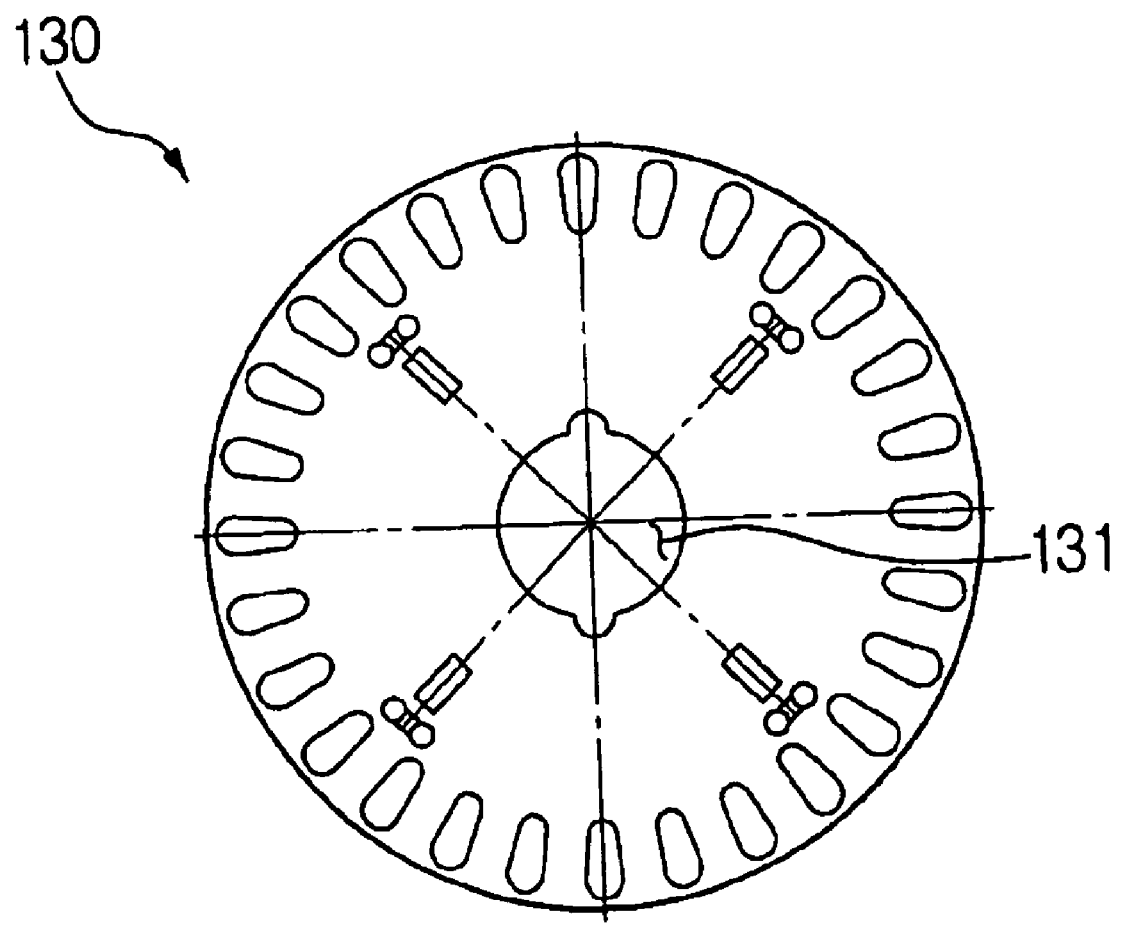
FIG. 4C is a plan view showing the thin iron sheets forming the second supplementary core of FIG. 3A.

Each thin iron sheet 120 forming the first supplementary core 134a (hereinafter called first supplementary core sheet), has a hole 121, corresponding to the thin iron sheets 110 forming the main core 131. From the hole 121, induced conductor holes 123 are formed to correspond to the thin iron sheets 110 of the main core 131. Additionally, the calkings 124 and the magnetic flux leakage preventing holes 125 are also formed to correspond to the thin iron sheets 110 of the main core 131. The magnet holes 112, formed at the thin iron sheets 110 of the main core 131, are not formed on the thin iron sheets 120 of the first supplementary core 134a. The hole 121 is extended to correspond to the outer structure connected with the rotor 130. On the other hand, the thin iron sheets (See FIG. 4C) forming the second supplementary core 134b has the same size hole 131 as the thin iron sheets 110 of the main core 131. Except for the hole 131, the thin iron sheet 130 of the second supplementary core 134b is the same as the thin iron sheet 120 of the first supplementary core 134a.

From now on, the method of manufacturing the rotor of the synchronous motor using the thin iron sheets 110 of the main core 131 and the thin iron sheets 120 of the first and the second supplementary cores 134a and 134b having a different construction from each other will be described.

First of all, the main core 131 is formed by laminating the thin iron sheets 110 as shown in FIG. 4A. Then the magnets 132 are inserted into the magnet holes 112 of the main core 131 formed in the laminated thin iron sheets 110. After that, the first and the second supplementary core 134a and 134b are formed by laminating the thin iron sheets 120 of FIG. 4B and the thin iron sheets having the same hole as the main core 131 at both ends of the main core 131 wherein a magnet 132 is inserted. Then, the induced conductor is ingoted through the laminated main core 131 and the first and the second supplementary cores 134a and 134b. The thin iron sheets 110 of the main core 131 and the thin iron sheets 120 of the supplementary cores 134a and 134b are connected with each other by the calkings 124 formed at each of the thin iron sheets. Therefore, when the thin iron sheets are moved to the next procedure, the iron sheets can be prevented from being dispersed.

If the rotor 130 is constructed through the above manufacturing procedure, the magnet 132 is built into the main core 131 and the supplementary cores 134a and 134b. The induce conductor 133 such as aluminum, which has been ingoted, naturally clamps the magnet 132 through the first and the second supplementary cores 134a and 134b. In other words, if the magnet 132 of the rotor 130 is seated in the main core 131, and the supplementary cores 134a and 134b, excluding the magnet holes 112, are laminated at both ends of the main core 131, the induced conductor 133, ingoted through the main core 131 of the first and the second supplementary cores 134a and 134b, holds the supplementary cores 134a and 134b from separation. Consequently, the magnet 132 is secured inside of the rotor 130.

As a result, the manufacturing method of the rotor 130 of the synchronous motor according to the present invention can exclude the procedure of riveting needed to clamp the magnet 132 when manufacturing the conventional rotor through the ingoted induced conductor 133 and the supplementary cores 134a and 134b.

As described above, the rotor 130 of the synchronous motor and the manufacturing method according to the present invention can improve the efficiency of the motor through the induced conductor 133 and the magnet 132, and naturally secure the magnet 132 by ingoting the induced conductor 133 through the main core 131 and the supplementary cores 134a and 134b. Therefore, the productivity can be improved because of the shortened procedure.

Although the preferred embodiment of the present invention has been described, it will be understood by those skilled in the art that the present invention should not be limited to the described preferred embodiment. Various changes and modifications can be made within the spirit and scope of the present invention as defined by the appended claims.

What is claimed is:

1. A rotor of a synchronous motor comprising:
a main core, formed from a plurality of laminated thin iron sheets, the thin iron sheets having a hole at a center for receiving a rotating shaft, and a number of magnet holes and a number of induced conductor holes radially formed in the thin iron sheets at a predetermined space differently from the hole;
a plurality of magnets inserted into the magnet holes of the main core;
supplementary cores having a hole and induced conductor holes corresponding to the hole and the induced conductor holes of the main core, the supplementary cores disposed at the ends of the main core in which the magnet is inserted; and
an induced conductor ingoted through the induced conductor holes of the main core and the induced conductor holes of the supplementary cores;
wherein the supplementary cores do not have any magnet holes and the supplementary cores cover the magnet holes at both ends of the main core.

2. The rotor of a synchronous motor of claim 1, wherein the supplementary cores are formed of a plurality of laminated thin iron sheets.

3. The rotor of a synchronous motor of claim 2, wherein the thin iron sheets of the main core and the supplementary cores respectively include calkings corresponding to each other.

4. The rotor of a synchronous motor of claim 1, wherein the induced conductor is made of aluminum.

* * * * *